(12) United States Patent
Maillard et al.

(10) Patent No.: US 11,397,113 B2
(45) Date of Patent: Jul. 26, 2022

(54) THERMOGRAPHIC SYSTEM

(71) Applicant: Safran, Paris (FR)

(72) Inventors: Samuel Louis Marcel Marie Maillard, Moissy-Cramayel (FR); Lionel Christian Jean-Loïc Gay, Moissy-Cramayel (FR); Thierry Patrick Maurice Chauvin, Moissy-Cramayel (FR); Benoît Bazin, Moissy-Cramayel (FR); Thomas Bernd Paulo Viassone, Moissy-Cramayel (FR)

(73) Assignee: Safran, Paris (FR)

( * ) Notice: Subject to any disclaimer, the term of this patent is extended or adjusted under 35 U.S.C. 154(b) by 220 days.

(21) Appl. No.: 16/633,494

(22) PCT Filed: Jul. 24, 2018

(86) PCT No.: PCT/FR2018/051895
§ 371 (c)(1),
(2) Date: Jan. 23, 2020

(87) PCT Pub. No.: WO2019/020929
PCT Pub. Date: Jan. 31, 2019

(65) Prior Publication Data
US 2021/0131875 A1    May 6, 2021

(30) Foreign Application Priority Data

Jul. 24, 2017  (FR) ...................................... 1757010

(51) Int. Cl.
*G01J 5/08*          (2022.01)
*G01J 5/04*          (2006.01)
*G01J 5/00*          (2022.01)
*F03D 17/00*         (2016.01)

(52) U.S. Cl.
CPC ............. *G01J 5/0896* (2013.01); *G01J 5/045* (2013.01); *F03D 17/00* (2016.05); *G01J 2005/0077* (2013.01)

(58) Field of Classification Search
CPC .. G01J 5/0896; G01J 5/045; G01J 2005/0077; G01J 5/04; G03B 11/045; G01N 25/72
See application file for complete search history.

(56) References Cited

U.S. PATENT DOCUMENTS 9,519,844 B1* 12/2016 Thompson ............ G06T 7/0004
2003/0230717 A1  12/2003 Reilly et al.
2005/0056786 A1   3/2005 Shepard et al.

FOREIGN PATENT DOCUMENTS

JP          2004-20336 A    1/2004
WO   WO 2011/137547 A2    11/2011

* cited by examiner

*Primary Examiner* — David P Porta
*Assistant Examiner* — Meenakshi S Sahu
(74) *Attorney, Agent, or Firm* — Blank Rome LLP

(57) ABSTRACT

The invention relates to a thermographic system comprising infrared imaging means, a radiation source and a duct (18) for guiding the radiation in a longitudinal direction (L) to an outlet of the duct (18) located at a free edge (28) thereof, characterized in that the free edge (28) of the duct (18) is deformable along the longitudinal axis (L) in a first direction (L1) oriented from the outlet of the duct (18) towards the imaging means (12) and in that it comprises means for returning the free edge to its initial shape and means for holding said free edge of the duct (18) in a deformed state.

10 Claims, 3 Drawing Sheets

THERMOGRAPHIC SYSTEM

This application is a national stage of International Application No. PCT/FR2018/051895, filed on Jul. 24, 2018, which claims the benefit of French Patent Application 1757010, filed Jul. 24, 2017, the contents of each of which are incorporated by reference herein.

The present invention relates to a thermographic system intended, for example, for the non-destructive testing of turbomachine parts such as turbine blades.

In the known technique shown in FIG. 1, a thermographic system used to carry out non-destructive testing comprises an infrared camera associated with a thermal excitation source (not shown). The infrared camera is arranged at one end of a duct 14 with a longitudinal axis L used to guide the radiation emitted by the thermal excitation source arranged in the duct and to an outlet end 16 of the duct.

An operation of non-destructive testing by thermography is carried out by positioning the area to be tested of a part at an optimal distance according to the imaging means 12, i.e. in such a way that the observed area is placed substantially in the focal plane of the imaging means 12. In addition, it is desirable to hold a longitudinal spacing between the free edge 16 of the guide duct 14 and the part in order to allow the heat generated by the radiation from the excitation source to dissipate and also to avoid contact between the free edge 16 of the duct 14 and the part which would lead to a conduction heat transfer from the duct 14 to the part which would damage the part.

However, when the area of the part to be analysed is concave, it may be difficult to position the area optically optimally with respect to the imaging means because the free edge 16 may come into contact with the part. In this case, it is not possible to have the correct distance between the central portion of the observed area and the imaging means. This changes the spatial resolution of the measurement and changes the amount of energy deposited by the thermal excitation means. Conversely, when the observed area is convex, the distance between the centre of the observed area and the imaging means is acceptable at the centre but this distance increases towards the periphery of the observed area. Thus, a scattering of the thermal excitation radiation is observed at the edges of the duct 14 since the longitudinal distance between the free edge 16 and the part is greater there.

An object of the invention is to provide a solution to the above-mentioned problems that is simple, effective, and inexpensive.

For this purpose, the invention provides a thermographic system comprising infrared imaging means, a source of thermal excitation radiation of a part to be tested and a duct for guiding the excitation radiation in a longitudinal direction to an outlet of the duct located at a free edge thereof, characterized in that the free edge of the duct is deformable along the longitudinal axis in a first direction from the outlet of the duct towards the imaging means and in that it comprises means for returning the free edge to its initial shape and means for holding said free edge of the duct in a deformed state.

According to the invention, the free edge of the duct is capable of deforming and retaining its deformation, which makes it possible to shape it with a shape corresponding to the edge of the area of the part which is intended to be observed with the imaging means following illumination of the part by the excitation radiation. In this way, it is possible to have a better longitudinal positioning of the imaging means with respect to the area of the part to be tested, more particularly a better positioning of the entire area to be tested in the focal area of the imaging means. In addition, the shaping of the free edge according to the zone periphery of the part to be examined allows a constant longitudinal distance between the free edge and the part, which allows a good control of the heat dissipation due to radiation. The return means allow the free edge to be returned to its original shape, i.e. in a second direction opposite the first direction.

According to the invention, the excitation source is a source emitting electromagnetic radiation capable of thermally exciting a portion of a part receiving said radiation. The radiation emitted by the source can be According to one characteristic, the duct may comprise a tubular box with a longitudinal axis carrying the imaging means and longitudinally elongated members forming the free edge of the duct and which are movable independently of each other in a direction parallel to the longitudinal axis relative to the box.

The longitudinal displacement of the rods allows the free end of the duct to be adapted to the shape of the part. In practice, it is understood that the number of elongated members determines the precision of adaptation of the shape of the free edge of the duct to the periphery of the area to be observed.

According to still another characteristic, the moving members are mounted on the box so that they can slide relative to each other along the longitudinal axis.

In a special embodiment, the moving members are sealingly mounted so as to slide in tubular bodies integral with the box and connected to the return means.

In an alternative embodiment of the invention, the return means comprise cylinders, for example pneumatic cylinders, which are integral with the box, preferably carried by the box.

The return means may also include means for supplying pressurised air to the tubular bodies of the box, the moving members being, for example, rods.

Also, the holding means may comprise at least one strip for supporting the moving members in a direction perpendicular to the longitudinal direction.

In a practical embodiment of the invention, the movable members are lamellae, these lamellae being able, for example, to slidingly cooperate each with adjacent lamellae in a form-fitting manner.

The guide duct may have a rectangular cross-section. Other forms are of course possible, such as circular sections for example.

The invention also relates to a method for using the thermographic system described above, the method consisting of:
arranging the free end of the duct in contact with a given area of a part to be tested and bringing said free end of the duct closer to the part until said free edge takes the shape of the periphery of the given area to be tested;
actuating the holding means so as to hold said free edge in the shape state obtained in the preceding step,
moving the duct longitudinally in the second direction so as to move its free edge away from the part to be tested by a given distance.

The invention will be better understood and other details, characteristics and advantages of the invention will become readily apparent upon reading the following description, given by way of a non limiting example with reference to the appended drawings, wherein:

FIG. 1 already described above, is a schematic perspective view of a thermographic system according to the prior art;

Figure 8:
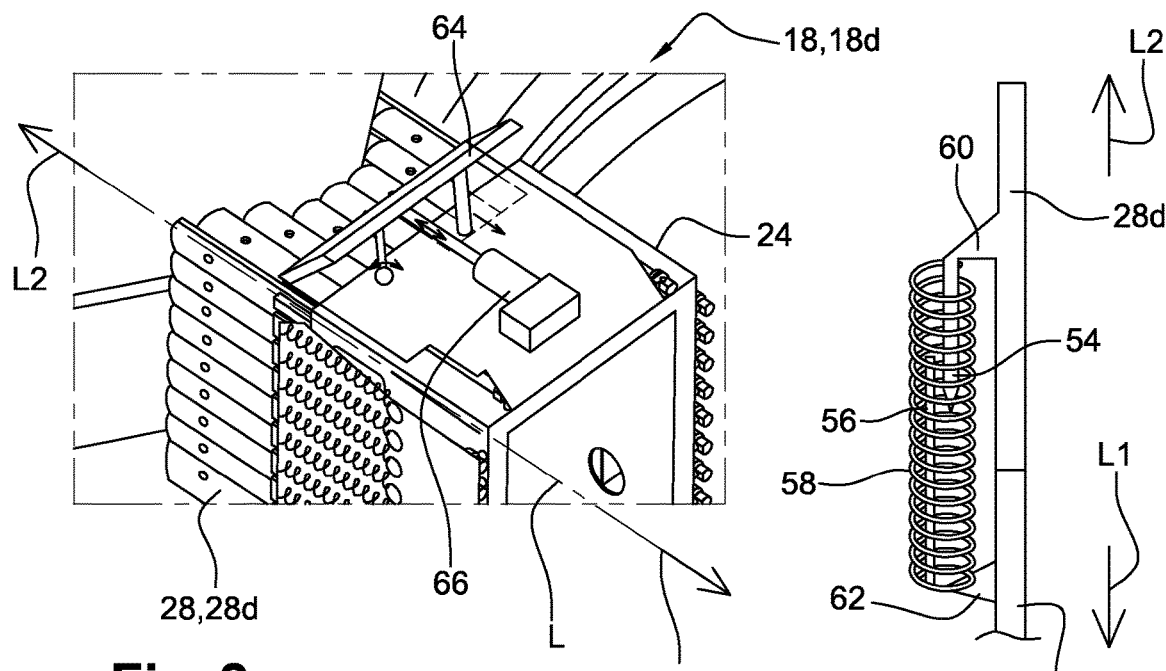
FIG. 8 is a schematic perspective view of a thermographic system according to a fourth embodiment of the invention.
Figure 9:
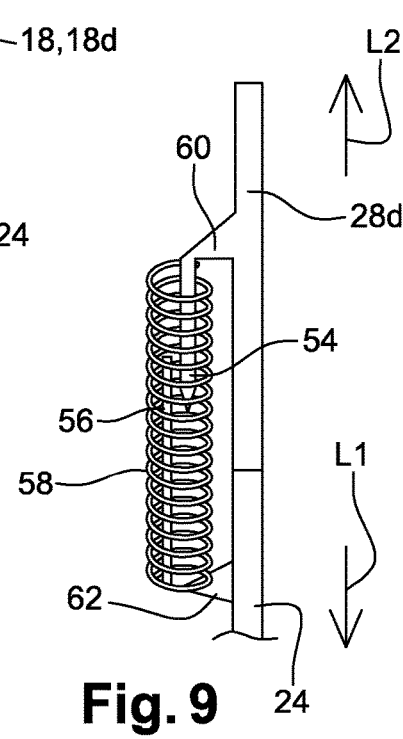

FIG. 9 is a schematic view of a the sliding of a movable member of the thermographic system of FIG. 8, In the various embodiments of the thermographic system 18 according to the invention, it comprises a duct 20 for guiding thermal excitation radiation and infrared imaging means 12. The duct 20 comprises a free edge 22 arranged at an outlet of the duct 20, the imaging means 12 being arranged at an end of the duct 20 opposite said free edge 22. The excitation radiation emitting means are arranged inside the longitudinal axis duct and are not specifically shown since they are well known to the state of the art. These excitation radiation emitting means are configured to emit excitation radiation towards the outlet of the duct 20 so that when said free edge 22 of the duct 20 is placed opposite a given area of the part to be tested, the excitation radiation can impinge on said area.

The duct 20 comprises a longitudinal axis L with a first direction L1 oriented from the free edge of the duct, i.e. from the outlet of the duct 20 to the imaging means 12, and a second direction L2 opposite the first direction L1.

The duct 20 comprises two portions: a static portion or tubular box 24 carrying the imaging means 12 and the thermal excitation radiation emitting means or thermal excitation source and a portion 26 movable relative to the tubular box 24 in the longitudinal direction L.

In particular, the movable portion 26 comprises a plurality of movable members 28 having an elongated shape in the longitudinal direction L and which are individually movable relative to each other in said longitudinal direction L relative to the box 24.

Figure 1:
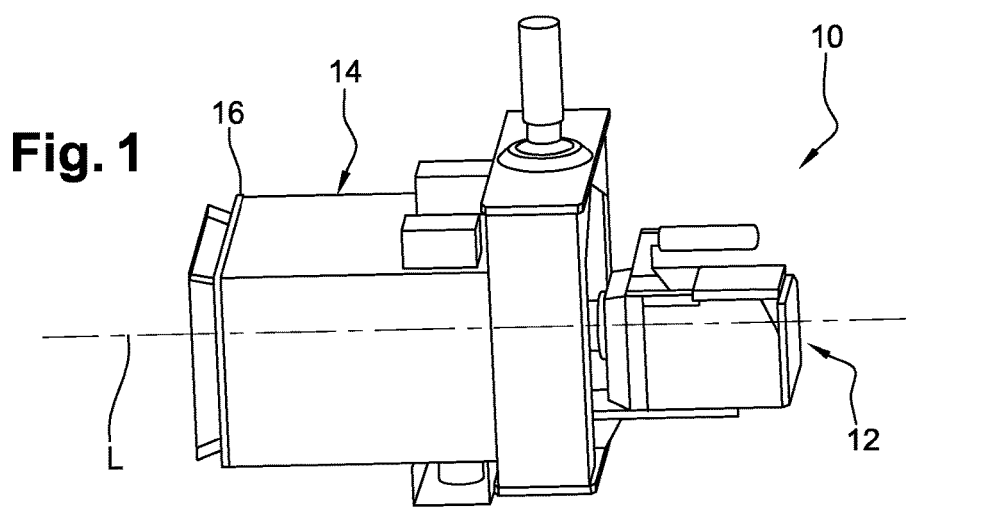
Figure 2:
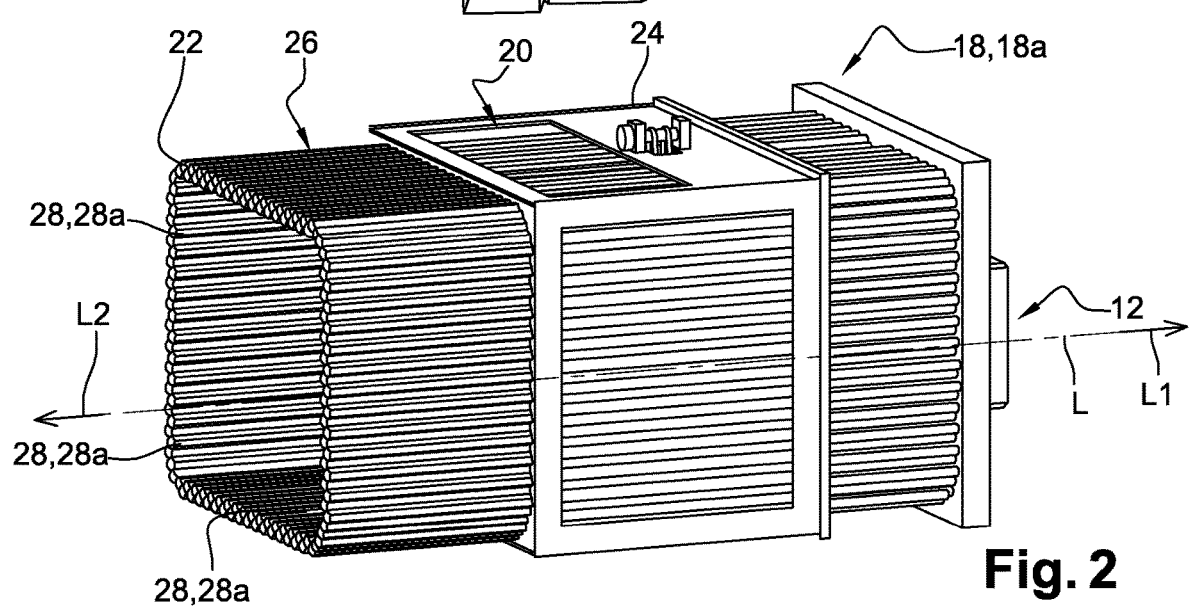
FIGS. 2 and 3 are schematic perspective views of a thermographic system according to a first embodiment of the invention.
Figure 3:
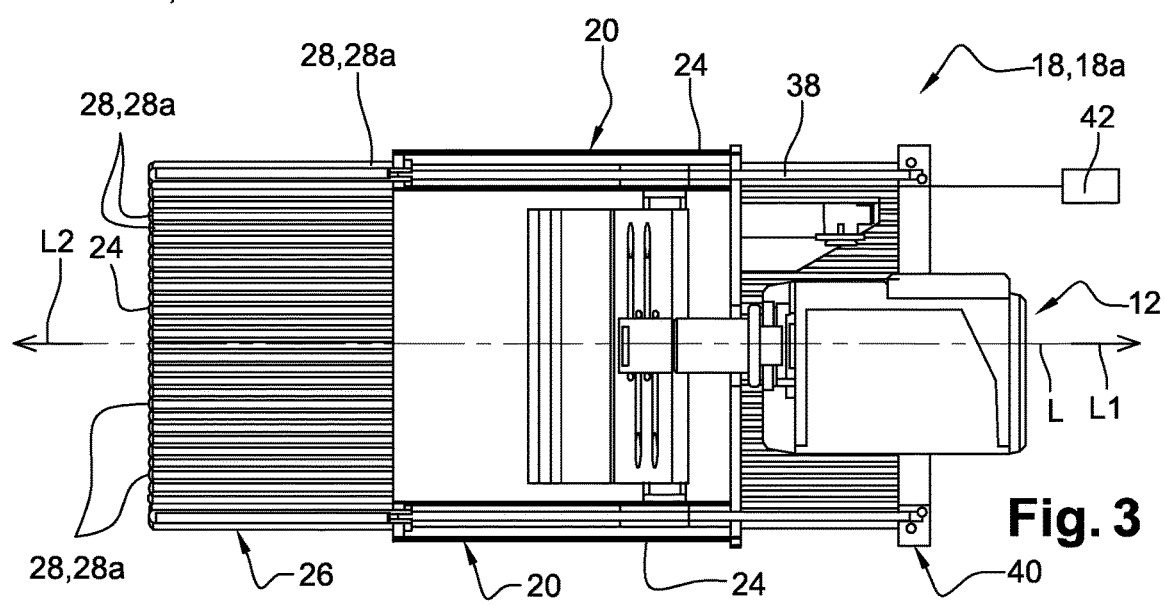
Figure 4:
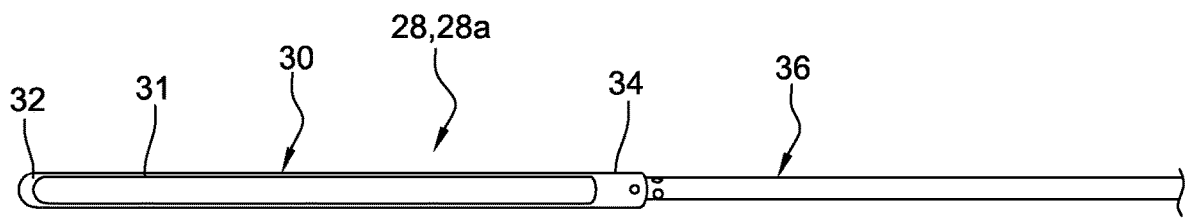
FIG. 4 is a schematic view of a movable member of the thermographic system of FIGS. 2 and 3.

In a first embodiment shown in FIGS. 2 and 3, the movable members 28 of the thermographic system 18a are rods 28a juxtaposed next to each other, each rod 28a being capable of sliding longitudinally with respect to two adjacent rods 28a. Each rod 28a comprises a first portion 30 having a hexagonal cross-section and comprising a through-opening 31 as shown in FIG. 4 for removing heat from the radiation. It should be noted that this first portion may not have an opening. In general and independently of its shape and the presence or absence of openings, the first portion 30 is made of a material having a low thermal conduction coefficient and which is able to reflect little of the thermal excitation radiation in order to concentrate the energy of the radiation on the part. This first portion 30 comprises a free end 32 intended to come to rest on the part to be tested and a second opposite end 34 connected to a second portion 36, for example made of metallic material, slidably engaged in tubular bodies 38 integral with the box 24 (FIG. 3). As can be seen in FIGS. 2 and 3, the end of the box 24 carrying the imaging means 12 is connected to a frame 40 supporting the longitudinally extending tubular bodies 38. The distal ends of the tubular bodies 38 of the frame 40 are connected to pressurized air supply means 42 such as those found in an aircraft manufacturing/maintenance facility.

To carry out a non-destructive testing operation, the free edge 22 of the duct 20, i.e. the free ends of the first portions 30 of the rods 28a are brought longitudinally opposite the part. The rods 28a being longitudinally slidable, the thermographic system is brought closer to the part so that said free edge 22 of the duct 20 takes the shape of the periphery of the given area to be tested. It is understood that in order to carry out the displacement of the rods 28a, the tubular bodies 38 are exhaust-bound so as not to exert unnecessary pressure on the part. The pressurised air supply means 42 act here as a return means, tending, during operation, to restore the free edge 22 to its original shape, thus allowing good control of the movement of the rods 28a as close as possible to the shape of the part. The movable rods 28a are then slidably locked relative to the box 24 by holding means formed here by the pressurised air supply means 42, the exhaust of which is blocked, thus holding the deformed state of the free edge 22 of the duct 20. The thermographic system is then moved back a given distance to perform the thermographic test immediately afterwards. The device 18, 18a thus allows a better positioning of the entire area to be tested in the focus area of the imaging means. It should also be noted that it is possible to have a constant distance between the part and the free edge 11 of the duct 20, which allows a better control of the evacuation of the heat generated by the excitation radiation.

Figure 5:
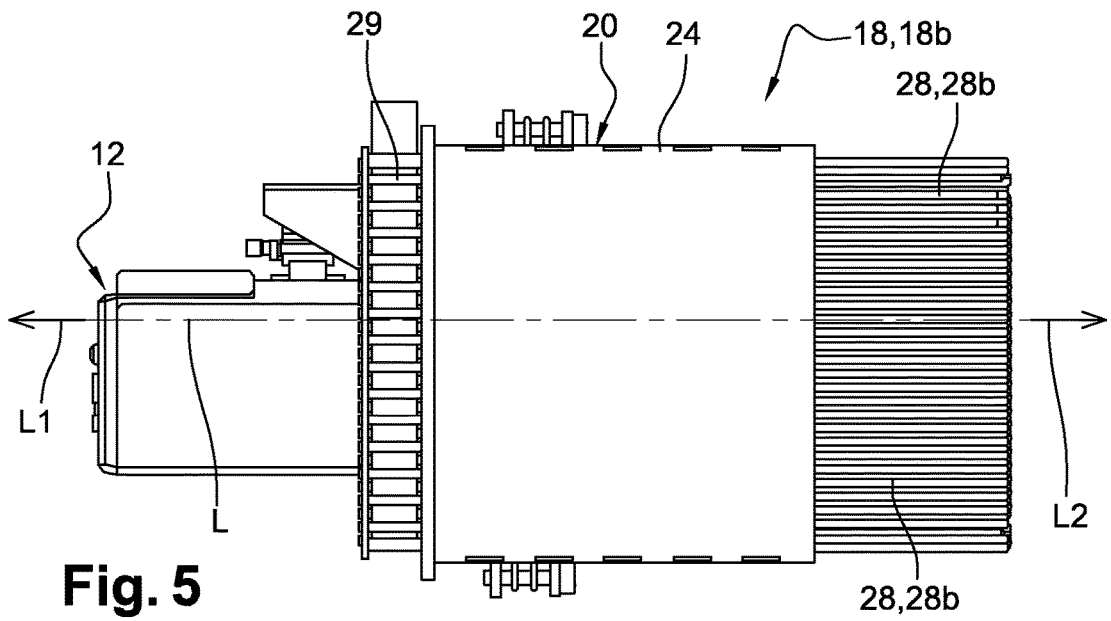
FIGS. 5 and 6 are schematic perspective views of a thermographic system according to a second embodiment of the invention.
Figure 6:
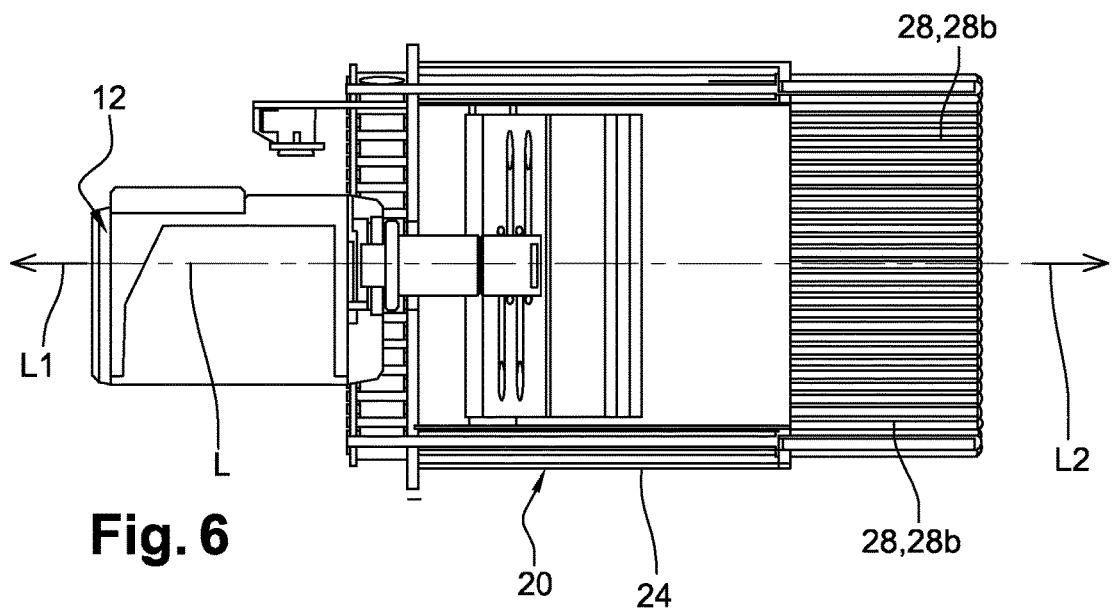

FIGS. 5 and 6 represent a second embodiment of a thermographic system 18b of the invention substantially similar to the one described with reference to FIGS. 2 and 3 since the movable members 28 are also rods 28b. These rods 28b are slidably engaged in tubes 29. The rods 28b and the tubes 29 may have circular cross-sections. An envelope snakes between the distal ends of the tubes 29 and ensures that the rods are held in a given position.

Figure 7:
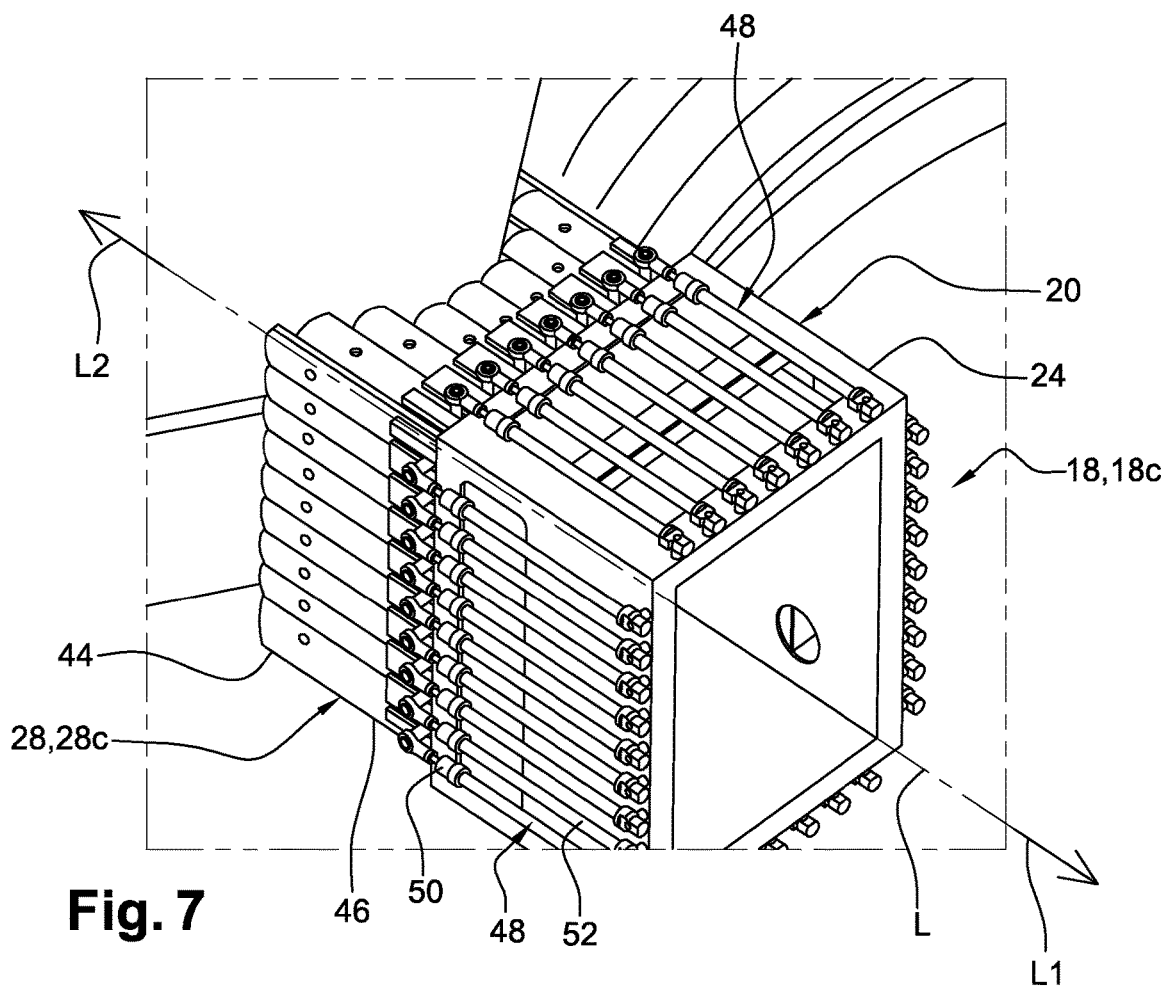
FIG. 7 is a schematic view, in perspective, of a third embodiment of the invention.

FIG. 7 shows a third embodiment of a thermographic system 18, 18c in which the movable members 28 are formed by lamellae 28c slidably juxtaposed next to each other. Each lamella 91 has a first end 44 and a second end 46. It also comprises a first side edge comprising a groove and a second opposite side edge comprising a rib. To ensure sliding of a given lamella with respect to its two adjacent lamellae, the groove of the first side edge of said lamella receives a rib of an adjacent lamella and the rib of the second edge of said lamella is engaged in a groove of an adjacent lamella.

The box 24 carries cylinders 48 for returning the lamellae 28c to their initial position. Each cylinder 48 has a piston rod 50 engaged in a cylinder body 52. The cylinders 48 extend longitudinally. A first end of the rod 50 is attached to the lamella 28c and a second end is slidably engaged in the cylinder body 52. In this embodiment, the free edge 44 of the duct 20 is held by holding each rod 50 in a given position by blocking the cylinder exhaust.

The box 24 includes lamellae sliding guide means 28c. These guiding means may, for example, include longitudinal recesses formed in the thickness of the box walls.

FIGS. 8 and 9 represent a fourth embodiment of a thermographic system 18d substantially similar to the third embodiment shown in FIG. 7. The sliding cooperation of the lamellae 28d with each other is identical to what has been described with reference to FIG. 7. In this embodiment, each lamella 28d has a first leg 54 extending in the first direction L1 and the box 24 has a second leg 56 extending in the second direction L2. A helical spring 58 is mounted around the first portion 54 and the second portion 56. In the undeformed state of the free edge, the helical springs 58 are compressed so that they exert a force in the second direction L2. The ends of the springs 58 are supported on flanges 60, 62 of the lamellae 28*d* and of the box 24, which join the first portions 54 to the lamellae 28*d* and the second portions 56 to the box 24, respectively.

The holding means comprise, in this fourth embodiment, a lamella 64 articulated for displacement by a cylinder 66 between a position where it is located at a distance from the lamellae 28*d* and a position of support on the lamellae 28*d* in a direction perpendicular to the longitudinal axis L. More specifically, when the box 24 has a rectangular section, the box 24 can support four cylinders, each associated with a lamella. A couple of cylinder/strip ensuring the locking of the lamellae on one side of the rectangular shape. The four cylinders are connected to common control means to simultaneously block all the lamellae.

The duct could be other than rectangular in cross-section and could be circular in shape or different to best suit the shape of the area to be tested.

In the various embodiments shown in the figures, the movable members are each movable between an extended position in which the movable members are almost completely extended from the tubes or tubular bodies, an intermediate position corresponding to a non-destructive testing position and a retracted position in which the movable members are retracted into the tubes or tubular bodies. During a non-destructive testing operation of a given area of a part, it is possible to move the rods to their retracted position in order to allow regeneration of the air inside the duct and avoid its heating which could have an impact on the thermography measurement of the tested area of the part.

The invention claimed is:

1. A thermographic system comprising:
   infrared imaging means; and
   a source for thermal excitation of a part and a duct for guiding the radiation in a longitudinal direction to an outlet of the duct located at a free edge thereof,
   wherein the free edge of the duct is deformable along the longitudinal axis in a first direction oriented from the outlet of the duct towards the imaging means and in that it comprises means for returning the free edge to its initial shape and means for holding said free edge of the duct in a deformed state.

2. The system according to claim 1, wherein the duct comprises a tubular box with a longitudinal axis carrying the imaging means and longitudinally elongated members forming the free edge of the duct and which are movable independently of one another in a direction parallel to the longitudinal axis relative to the box.

3. The system according to claim 2, wherein the movable members are mounted on the box so as to slide relative to one another along the longitudinal axis.

4. The system according to claim 2, wherein the movable members are sealingly mounted so as to slide in tubular bodies integral with the box and connected to the return means.

5. The system according to claim 4, wherein the return means comprise cylinders, for example pneumatic cylinders, integral with the box.

6. The system according to claim 4, wherein the return means comprise means for supplying pressurized air to the tubular bodies of the box, the movable members being for example rods.

7. The system according to claim 2, wherein the holding means comprise at least one strip for bearing on the movable members in a direction perpendicular to the longitudinal direction.

8. The system according to claim 2, wherein the movable members are lamellae.

9. The system according to claim 1, wherein the guide duct has a rectangular section.

10. A method for using the system according to claim 1, wherein it consists in:
    arranging the free end of the duct in contact with a given area of a part to be tested and bringing said free end of the duct closer to the part until said free edge takes the shape of the periphery of the given area to be tested;
    actuating the holding means so as to hold said free edge in the shape state obtained in the preceding step,
    moving the duct longitudinally in the second direction so as to move its free edge away from the part to be tested by a given distance.

* * * * *